United States Patent [19]

Williams

[11] Patent Number: 6,019,819
[45] Date of Patent: Feb. 1, 2000

[54] APPARATUS AND METHOD FOR EXTRACTING HEAT FROM CONTAMINATED WASTE STEAM

[75] Inventor: Eddy A. Williams, Pocatello, Id.

[73] Assignee: Alpha Engineers, Inc., Pocatello, Id.

[21] Appl. No.: 09/044,195

[22] Filed: Mar. 17, 1998

[51] Int. Cl.[7] ............................ B01D 50/00; B01D 47/06; B01D 47/12; B01D 5/00; B01D 17/025
[52] U.S. Cl. ................................ 95/206; 95/188; 95/199; 95/200; 95/202; 95/221; 95/224; 95/225; 95/227; 95/288; 96/238; 96/242; 96/273; 96/355; 96/358; 55/315.2; 55/318; 55/421; 55/444; 55/467; 55/DIG. 36; 261/116
[58] Field of Search .............................. 95/199, 200, 202, 95/206, 221, 223, 224, 225, 227, 188, 288; 96/355, 358, 360, FOR 147, FOR 149, 239, 242, 236, 238, 234, 273, 294; 55/315.1, 315.2, 318, 444, DIG. 36, 421, 467; 261/116, 111, 169, DIG. 9

[56] References Cited

U.S. PATENT DOCUMENTS

| | | | |
|---|---|---|---|
| 2,612,745 | 10/1952 | Vecchio | 60/29 |
| 2,940,733 | 6/1960 | Umbricht | 96/355 |
| 3,616,744 | 11/1971 | Jensen | 55/444 |
| 4,277,453 | 7/1981 | Aiken et al. | 423/247 |
| 4,426,210 | 1/1984 | Drawert et al. | 55/73 |
| 4,482,363 | 11/1984 | Mink | 55/69 |
| 4,708,722 | 11/1987 | Childs | 55/89 |
| 4,799,941 | 1/1989 | Westermark | 261/DIG. 9 |
| 5,846,272 | 12/1998 | Natter | 96/355 |

FOREIGN PATENT DOCUMENTS

WO 93/18348  9/1993  WIPO ............................ 55/DIG. 36

*Primary Examiner*—David A. Simmons
*Assistant Examiner*—Robert A. Hopkins
*Attorney, Agent, or Firm*—Frank J. Dykas

[57] ABSTRACT

Disclosed is a contaminated waste steam heat recovery apparatus 10 and method therefore which includes a primary condensing unit 38, a low pressure water washing unit 26, a liquid to liquid heat exchanger 36 and a vent fan 31. Waste gas is ducted from fryer 11 to a de-super-heating chamber 14 wherein superheated steam is converted to saturated steam by spraying water into the steam using spray nozzles 15. The gas is then introduced into a vertically disposed air to liquid heat exchanger 16 and is drafted downward therethrough. As heat is removed from the waste gas, water vapor in the steam condenses and in the process, collects some of the oil and hydrocarbons present. A plurality of condensate trays 19 are disposed below the bottom end of heat exchanger 16 in a cascading fashion to collect hold the condensate in the airflow path such that it will absorb some of the heat still present in the remaining waste gas. An oil outlet 22 is provided at the top of collection basin 22 for drawing off concentrated oil 23. The waste gas is pulled into a low pressure water washer 26 where it is washed by a second set of spray nozzles 15. Waste gas and water are sucked downward through a set of turbulence inducing baffles 28. The remaining waste gas is sucked out though exhaust tube 30, using vent fan 31, and vented to the atmosphere.

6 Claims, 1 Drawing Sheet

6,019,819

APPARATUS AND METHOD FOR EXTRACTING HEAT FROM CONTAMINATED WASTE STEAM

BACKGROUND OF THE INVENTION

1. Technical Field

This invention generally relates to heat exchangers for extracting the heat from processing exhausts, and more particularly, this invention relates to an apparatus and method for extracting heat from the contaminated steam produced by food processing, especially french fry fryers and the like, and for reducing pollution in both the exhaust vented to the atmosphere and in the liquid effluent produced.

2. Background Art

Food processing plants consume vast amounts of energy, primarily in the form of steam used for steam peeling, blanching, cooking, etc., and for heating water, a substantial amount of which is used for keeping everything in the plant clean. Upwards of 20% of the energy used in a french fry processing plant is used to heat potable water for cleaning and washing.

Industrial french fry fryers are large, long, continuous feed fryers which can fry upwards of 25,000 pounds per hour of potatoes during the processing operation. The oil in which the potatoes are fried is generally held at 380° F. and the raw french fries are continuously fed into this oil. During the cooking process, approximately 25% of the moisture content of the potatoes is removed. The hot oil boils the moisture from the potato pieces and the water leaves the oil as bubbles of steam. Being lighter than air, this steam continues to rise upward. Generally a hood above the oil confines the steam and allows it to escape or be drawn upward through a vent stack to atmosphere. Assuming a raw potato feed rate of 25,000 lbs. per hour, this translates to between 5,000 to 7,000 pounds per hour of steam being wasted by venting to the atmosphere. This steam has entrained within it organic hydrocarbons, trace minerals and frying oil. Since the steam is contaminated, it has always been considered pure waste. The mixture of steam, oil, hydrocarbons and trace minerals is later referred to in this disclosure as waste gas.

As previously stated, the waste gas released by the fryer and hood is actually not pure steam, but rather a mixture of steam, air and cooking fumes. The fumes consist of suspended droplets of oil and organic hydrocarbon gasses. Some of the organic gasses can be condensed at lower (cooling water) temperatures and some of these gasses cannot be readily condensed. In addition, air, which is also not condensable, is drawn into the fryer's hood from outside of the fryer by the draft created when the steam rises into the vent stack. Many of these vent stacks release the waste gas directly to the atmosphere. Some fryers are equipped with vent fans which enhance or power the flow of exhaust gas leaving the fryer. Some fryers use cold or cool water in direct contact with the waste gas stream, often in spray chambers after the fryer, so that the oil droplets, condensable cooking fumes and the steam with its heat energy are condensed or "scrubbed" from the non-condensable gasses and are carried away with the sprayed water as liquid waste. Fryers not having wet scrubbers waste the steam and cooking fumes to the atmosphere causing air pollution.

A heat exchanger could be used to condense the steam and heat water for other uses, but the problem with applying conventional condensing heat transfer technology to extract the heat from the waste stream is that as the steam condenses the air and other non-condensable gases concentrate or collect next to the heat transfer surfaces and form a barrier. This barrier is an insulator, which greatly impedes the heat transfer from the steam to the cooling water. If the non-condensables are not continuously removed from the condenser, they will eventually fill it and all heat transfer between the steam and cooling water will stop.

DRAWERT ET AL., U.S. Pat. No. 4,426,210 discloses a process for washing the odor-emitting substances from waste air which incorporates an air to liquid heat exchanger, a gas washing chamber and a vent fan to pull the waste air through the apparatus. Unfortunately, the device is not designed to handle large quantities of steam or other condensable vapors or to remove condensate and liquid or condensed pollutants, such as oil and the like. It is readily apparent that the heat exchanger of this invention would quickly become fouled by the water and oil which is necessarily extracted in the heat exchanger.

CHILDS, U.S. Pat. No. 4,708,722 teaches a combination air washer and liquid to liquid heat exchanger for removing heat and pollutants from the smoke present in a chimney or the like. Unfortunately, the only significant condensing gas to liquid heat transfer which takes place in this apparatus happens in the washing process by the water droplets as they fall toward the collection basin. Obviously, this is unacceptably inefficient for recovering the vast amount of heat generated by a typical industrial french fryer or similar cooker. Since the waste gas is first directly contacted and mixed with the water stream from which heat is recovered, that water stream must be held at a low temperature or much of the heat of the waste gas will exit with the exhaust as vaporized water. If the water collected at the bottom of the spray chamber is substantially below boiling temperature, then the heat recovered by the heat exchanger will be at an even lower temperature and therefore of less use.

Both of the above prior art devices cited require and use an external source of water which directly contacts the waste gas and produces a dilute liquid waste stream which is substantially cooled by the supplied water.

The inventor is unaware of any prior solution which is tailored to the peculiar problems presented by the waste steam produced by large food processing fryers and the like. Two of the primary problems presented by this application are the provision for constant removal of condensate and other agglomerates from the surfaces of the gas to liquid heat exchanger and a method of separating the oil from both the exhaust gas and the condensed water. What is needed is an apparatus and method for recovering heat from contaminated waste steam, which doesn't require continual manual cleaning and maintenance and which will reduce the pollutants vented to the atmosphere and in the liquid effluent produced.

It is therefore an object of this invention to provide a means for extracting the heat from the waste gases of the big commercial frying machines by condensing the waste steam in a down flow cooled surface heat exchanger, and using the extracted heat for other purposes such as heating potable water for plant cleaning and the like. It is a further object of this invention to provide a means for removing a substantial amount of the oil and hydrocarbons present in both the waste gas and liquid effluent produced by industrial fryers and the like.

DISCLOSURE OF INVENTION

The primary source of energy held in the waste gases of the fryer is held in the form of heated steam which is technically super heated in the depressed partial pressures of the drafting stack or venting system.

Typical temperatures of the waste gas leaving a fryer range from approximately 200° F. to 300° F. The waste gas is ducted from the fryer to a de-super-heating mixing chamber where water is introduced into the waste gas stream. The water is vaporized by the warmer waste gas absorbing heat and reduces the waste gas temperature to its corresponding saturation temperature so that condensation of the steam can begin when the gas flows onto the surface of a cooled condensing heat exchanger. At 200° F. saturated waste gas can hold approximately 3 pounds of steam for every pound of air. It has been found that most of this energy is extracted by condensing steam and reducing the waste gas temperature to between 150° and 180° F., at which point enough steam has been condensed out of the waste gas to reduce the ratio of steam to air to approximately 0.7 or less pounds of steam per pound of air.

The invention is accomplished by first reducing the steam to its saturation temperature in a de-super-heating mixing chamber. In the de-super-heating mixing chamber water mixes with the waste gas using wetted surfaces, pressurized sprays or a combination of the two. The mixing chamber need not be a separate enclosure, but can be located in the ductwork leading from the fryer to the surface condenser or in the inlet of the surface condenser. The surface condenser consists of a conventional heat exchanger where two fluids are separated by metal surfaces and contained in a vessel. In this case the two fluids are the waste gas which is being partially condensed and potable cooling water which is being heated.

As previously stated there are a large number of condensables entrained in the steam. These condensables, along with the condensed water and suspended droplets of oil, collect on the surfaces of the heat exchanger and subsequently cool further as they drip downward or are carried by the waste gas out of the heat exchanger. A series of cascading water trays are located beyond or downstream of the surface condenser. These are designed to collect, and then reheat the condensate, which is a mixture of both water, condensable hydrocarbons and oil. In a separate tank or below the trays, the oil is separated from the water. It has been found in practice that heating the condensed liquids to approximately 150° F. to 180° F. will optimize the separation of the oil from water, with the oil floating to the top where it can be drained off, and the still contaminated but purer water below where it can be drawn off from the bottom.

The remaining waste gas is then sucked into a low pressure water washer where cooled condensate is recycled to literally wash most of the rest of the steam and condensable hydrocarbons or fumes and suspended droplets out of the waste gas. This process occurs in a closed loop cycle in which the cooled condensate is drawn off the bottom of the low pressure water washer, cooled through a liquid to liquid heat exchanger and then re-sprayed into the low temperature waste gas-steam mixture. The other side of the liquid to liquid heat exchanger pre-heats the potable cooling water prior to being heated further in the waste gas surface condenser. Excess condensate which accumulates from condensation in the water washer section over flows and then back flows into the liquid collection basin of the waste gas surface condenser where it is drawn off as waste condensate.

To further facilitate continuous mixing of the steam and non-condensables in both the heat exchanger tubes and the water washer, a plurality of turbulence inducing means, such as baffles, can be provided therein to force the air and steam mixture to continuously recirculate and remix, and for the purposes of inducing turbulence to promote the agglomeration of the suspended liquid droplets and the condensing of condensable vapors.

Final washed waste gas, including air and other non-condensed gasses and some suspended droplets of oil then exit the low pressure water washer to be vented to the atmosphere or proceed on to secondary washers or processes.

A means to power the flow of waste gas through the entire system is provided. This means can be located at the inlet of the waste gas surface condenser, at the inlet of the low pressure water washer, at the outlet of the low pressure water washer or beyond with secondary equipment in the waste gas flow. The means to power flow will use less energy if it is located further downstream in the waste gas flow where there is less steam mass and therefore a smaller volume of gas to move. When the means to power flow of the waste gas is located further upstream, the surface condenser will operate at a higher temperature and produce hotter cooling water temperatures.

BEST MODE FOR CARRYING OUT INVENTION

Figure 1:
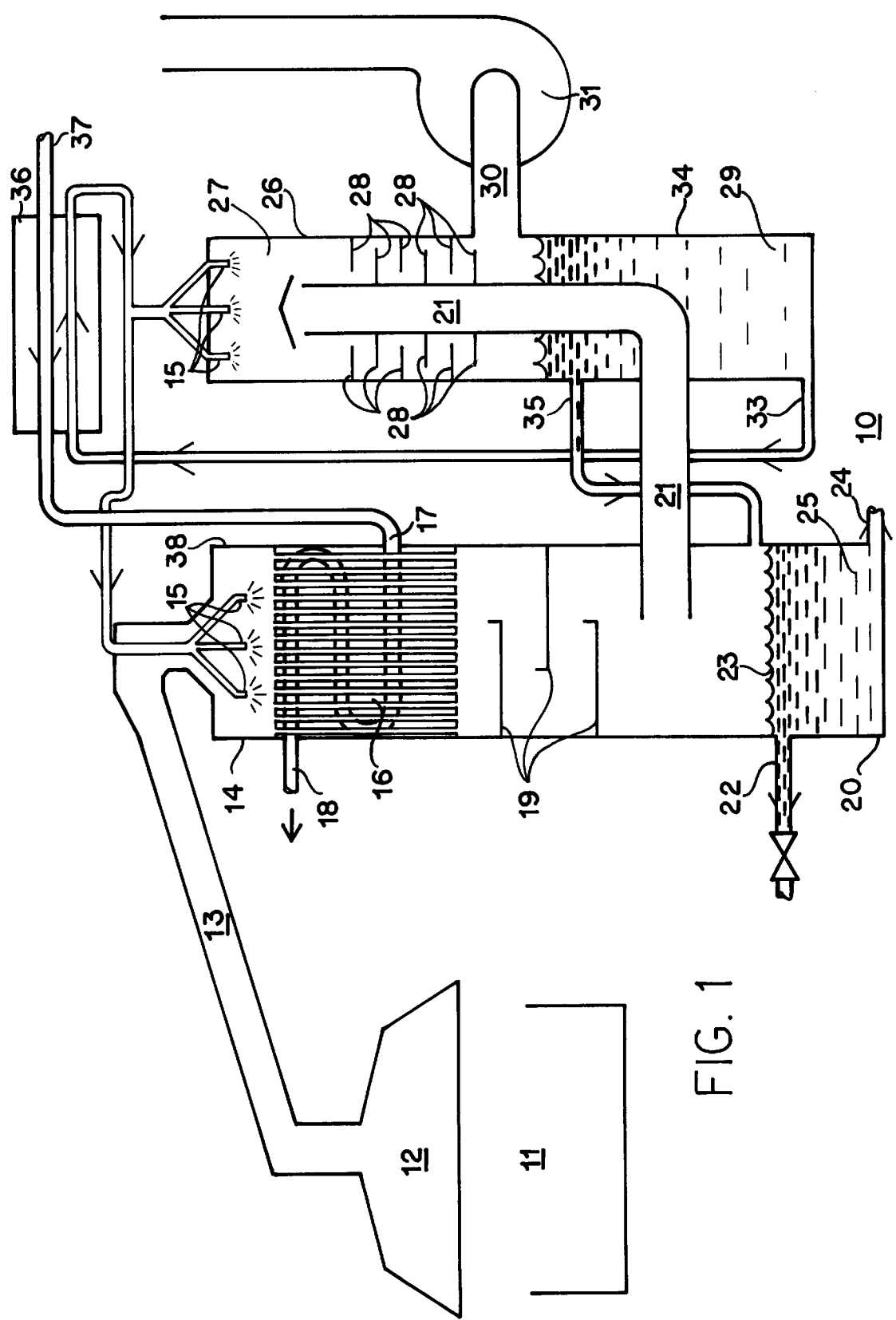
FIG. 1 is a schematic representation of a contaminated waste steam heat recovery and pollution reducing apparatus.

Referring now to the FIGURE, both the apparatus and the method of the invention will be described in detail. The contaminated waste steam heat recovery apparatus is generally designated as 10 and here includes a surface condensing unit 38, a low pressure water washing unit 26, a liquid-to-liquid heat exchanger 36 and a waste gas exhaust fan 31.

The surface condensing unit 38 in the preferred embodiment has an elongated and generally vertical housing which is attached at its top to the exhaust duct 13 from the exhaust hood 12 of french fry fryer 11. The surface condensing unit 38 can conceptually, and in fact is further divided or broken down into three separate subassemblies, a de-super-heating mixing chamber 14, a water-cooled condensing heat exchanger 16, and a condensate collector and reheating chamber 20. However, in this Best Mode Section, the preferred embodiment is combined surface condensing unit 38.

The waste gas is ducted from fryer 11 into a de-super-heating chamber 14 where the super heated steam contained within the waste gas is reduced to the appropriate saturated steam temperature. This is accomplished by spraying water into the steam using spray nozzles 15. The typical temperature range for waste gas leaving a fryer is between 200° F. and 300° F., which in the preferred embodiment is the temperature range of the waste gas when it enters de-superheating chamber 14. At this point in time the waste gas contains approximately three pounds of steam to every pound of air, both mixed together with condensable fumes or hydrocarbons and an aerosol of entrained frying oil and other organic material. The water which is sprayed into the exhaust gas is at a temperature of approximately 85° F. This water spray is vaporized by the waste gas, absorbing heat and reducing the temperature of the waste gas to approximately 200° F. which represents the saturation temperature of the steam at the reduced pressure present in the exhaust stream.

The saturated waste gas is then introduced into a vertically disposed waste gas to cooling water heat exchanger 16, and is drafted downward therethrough. In the preferred embodiment heat exchanger 16 is vertically oriented, however it is not necessary that it be vertical, only that waste gas, and waste gas condensate flow be downwardly oriented in the same general direction. The reason for this is that it is necessary that the flow of waste gas within heat exchanger 16 continuously and effectively wash noncondensable waste gas and waste gas condensate from the heat transfer surfaces of heat exchanger 16. The air to liquid heat exchanger 16 transfers a substantial amount of heat from the exhaust gas to the potable water which serves as the cooling water, and which is used in other plant operations such as steam peeling, blanching and cleaning. The potable water enters the heat exchanger at inlet 17 and exits at outlet 18. As heat is removed from the waste gas, saturated steam condenses and in the process, collects some of the oil and hydrocarbons present in the waste gas. The resulting droplets collect on the surfaces of the heat exchanger and are subsequently washed by the flow of waste gas down and out the bottom of heat exchanger 16 into the condensate and collector and reheating chamber 20. This condensate has a temperature within the range of approximately 150° F. to 180° F. while the remaining waste gas is slightly warmer at approximately 185°.

Additionally, turbulence within the heat exchanger 16 adds to the collection process by promoting agglomeration of condensing steam, water vapor, and the non-condensables. To this end, baffles can be placed within the normal air flow path of the heat exchanger 16, as is similarly employed within low pressure water washer 26, explained later.

A plurality of condensate trays 19 are disposed below the bottom end of heat exchanger 16 in a cascading fashion. The trays 19 serve both to increase the turbulence within the airflow path and to hold the condensate in the airflow path such that it will reabsorb some of the heat still present in the remaining waste gas. It is desirable to reheat the condensate to approximately 180° Fahrenheit to promote the separation of the oil from the water. The viscosity of the oil is substantially reduced at this temperature which facilitates the natural separation of the oil from the water.

As the condensate trays 19 fill, the heated condensate will overflow and will eventually collect at the base of the primary condensing unit 38 in collection chamber 20. An oil outlet 22 is provided at the top of collection basin 22 for drawing off concentrated oil 23 which collects and "floats" on the top of the purer water and oil mixture 25. A more diluted water and oil mixture 25 is extracted through outlet 24 and is generally directed to a decanting tank or the like for further liquid waste effluent purification and treatment.

The remaining waste gas, which now has less that one pound of steam for each pound of air, is pulled into a low pressure water washer 26 through exhaust transfer tube 21. Cooling water is again introduced into the waste gas by a second set of spray nozzles 15 located in condensing and washing chamber 27. The waste gas and water are sucked downward through a set of turbulence inducing means 28, such as baffles, with additional steam and some oil condensing and collecting out of the gas as a result. This condensate, now at a temperature of approximately 100° Fahrenheit, collects in cooled condensate collection basin 29 and is subsequently pumped through a liquid to liquid heat exchanger 36 and then re-sprayed in closed loop fashion into new incoming waste gas. This closed loop system condenses most of the remaining steam and washes most of the remaining condensable hydrocarbons and droplets of oil from the waste gas.

Condensate 29 from the low pressure water washer 26 collects in water washer basin 34 until it overflows through back flow line 35 into collection basin 20 of primary heat exchanger 38 where it mixes with water and oil mixture 25 prior to extraction as previously described.

The liquid to liquid heat exchanger 36 is used to pre-heat the potable cooling water, coming from inlet 37 which supplies cooling water to heat exchanger inlet 17, to a temperature of approximately 90° Fahrenheit.

With nearly all of the steam and other condensable gases now condensed and most of the oil and condensable hydrocarbons removed, the remaining waste gas is sucked out though exhaust tube 30, using vent fan 31, either being vented to the atmosphere or directed on to secondary washers or processors. In this preferred embodiment vent fan 31 is located at the downstream end of the heat exchange process. This is the point of lowest system pressure and the least volume of waste gas to exhaust, hence requiring smaller air handling equipment and the least power consumption. However, this is not the only suitable location for the waste gas air handling equipment. It can easily be located further upstream in the process, even upstream of the fryer. This may, in some cases, be desirable, in spite of the required increase in air handling capacity and power consumption, since it will result in surface condenser 38 operating at higher temperatures, hence producing hotter coolant temperatures.

This process results in a savings in the amount of energy used to heat plant water and results in both a reduction of the pollution vented to the atmosphere and pollution in the resulting effluent.

While there is shown and described the present preferred embodiment of the invention, it is to be distinctly understood that this invention is not limited thereto but may be variously embodied to practice within the scope of the following claims.

I claim:

1. A method of removing heat, oil and pollutants from the waste gas of food fryers, which comprises the steps of:

first, reducing the temperature of the waste gas to its corresponding saturation temperature;

second, transferring heat from the waste gas to a liquid in an air to liquid heat exchanger and causing the portions of gas to condense and agglomerate by passing the waste gas downwardly through the air to liquid heat exchanger, thereby producing a mixture of oil, water, pollutants and waste gas;

third, collecting the mixture and holding the mixture for a predetermined period of time in a series of cascading trays;

fourth, heating the mixture being held in the airflow path by the waste gas passing therethrough to produce a separation of the oil therefrom;

fifth, collecting and holding mixture which overflows the cascading trays in a collection basin to produce a further separation of oil from the mixture;

sixth, removing separated oil from the mixture;

seventh, washing additional water, oil and pollutants from the remaining non-condensed waste gas; and eighth, venting the remaining waste gas.

2. The method of claim 1 further comprising the step of inducing turbulence in the waste gas to promote the agglomeration and subsequent collection of condensate, oil and pollutants.

3. An apparatus for removing heat, oil and pollutants from the waste gas of food fryers, which comprises:

saturation means for receiving the waste gas from the fryer and for reducing the temperature of the gas to its corresponding saturation temperature;

a downwardly disposed gas to liquid heat exchanger, having an upper end operatively connected to the saturation means, and a lower end, for transferring heat from the gas to a liquid in the heat exchanger and causing portions of waste gas to condense and agglomerate by passing the waste gas through the heat exchanger from its upper end to its lower end;

collection means being held below the lower end of the gas to liquid heat exchanger for receiving, collecting and separating the mixture of oil, condensate water and pollutants, said collection means further comprising a plurality of condensate trays being held below the lower end of the air to liquid heat exchanger and disposed in a cascading fashion to collect and hold a condensate mixture of oil, water and pollutants in the path of the waste gas, resulting in the heating of the mixture to a temperature at which the viscosity of the oil promotes separation from the mixture, said collection means further comprising a collection basin positioned below the condensate trays for collecting and holding condensate passed from the condensate trays;

oil extraction means for removing separated oil from the mixture held in the collection means;

water washing means operatively connected to the lower end of the gas to liquid heat exchanger for receiving the remaining non-condensed waste gas for washing additional condensate, oil and pollutants from the waste gas; and forced air venting means for venting from the water washing means the remaining waste gas.

4. The apparatus of claim 3 further comprising a turbulence inducing means to promote the agglomeration and subsequent collection of condensate, oil and pollutants.

5. An apparatus for removing heat, oil and pollutants from the waste gas of a food fryer, which comprises:

a saturation means for receiving the waste gas from the food fryer and for reducing the temperature of the waste gas to its corresponding saturation temperature;

a downwardly disposed gas to liquid heat exchanger, having an upper end operatively connected to the saturation means, and a lower end, said heat exchanger for transferring heat from the gas to a liquid and causing portions of waste gas to condense and agglomerate by passing the waste gas through the heat exchanger from its upper end to its lower end;

a first collection means being held below the lower end of the gas to liquid heat exchanger for receiving, collecting and separating the mixture of oil, condensate water and pollutants, said first collection means further comprising a plurality of condensing trays being held below the lower end of the air to liquid heat exchanger and disposed in a cascading fashion to collect and hold a condensate mixture of oil, water and pollutants in the path of the waste gas, resulting in the heating of the mixture to a temperature at which the viscosity of the oil promotes the separation from the mixture, said first collection means further comprising a collection basin positioned below the condensing trays for collecting and holding condensate passed from the condensing trays;

an oil extraction means for removing separated oil from the mixture held in the collection means;

a water washing means operatively connected to the lower end of the gas to liquid heat exchanger for receiving the remaining non-condensed waste gas for washing additional condensate, oil and pollutants from the waste gas;

a second collection means being held below the lower end of the water washing means for receiving, collecting and separating the additional condensate, oil, and pollutants washed from the waste gas, wherein concentrated, separated additional condensate, oil, and pollutants are returned to the first collection means for further oil extraction, wherein diluted, separated additional condensate, oil, and pollutants are supplied to the saturation means; and a forced air venting means for venting from the water washing means the remaining waste gas.

6. The apparatus of claim 5 further comprising a turbulence inducing means to promote the agglomeration and subsequent collection of condensate, oil and pollutants.

* * * * *